June 12, 1945.  E. K. KAPRELIAN  2,378,301
OPTICAL SYSTEMS
Filed April 8, 1944
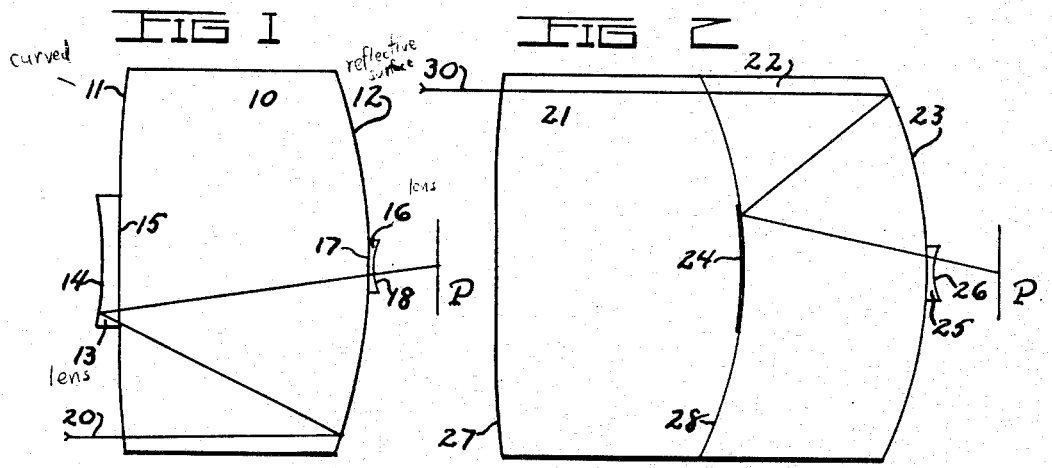
Edward K. Kaprelian  Inventor Patented June 12, 1945

2,378,301

UNITED STATES PATENT OFFICE 2,378,301

OPTICAL SYSTEM

Edward K. Kaprelian, Alexandria, Va.

Application April 8, 1944, Serial No. 530,166

9 Claims. (Cl. 88—57)

This invention relates to a novel optical system whereby a great effective focal length and a large relative aperture are obtained with extremely short back and front focal lengths.

One object of the invention is to utilize a solid glass system utilizing cemented surfaces and having both reflecting and refracting surfaces.

Another object of the invention is to provide a refracting lens system whereby a cemented surface acts to refract light twice, i. e., once in a first direction and again in returning.

Still another object of the invention is to provide an optical system whereby a single lens surface acts to refract light three times.

Still another object of the invention is to provide a catadioptric optical system related to both the Schmidt reflector and the Cassegrainian mirror, but without necessitating the use of aspheric correcting plates as in the Schmidt reflector or the parabolic reflecting mirror or the rigid supporting means for the secondary mirror in the Cassegrainian system.

The invention may take various forms in practice but the most convenient forms are shown in the accompanying drawing in which:

Fig. 1 shows a preferred arrangement of the optical system intended particularly for use as a wide aperture anastigmatic photographic objective of great focal length.

Fig. 2 shows a modification of the optical system utilizing a sort of solid Schmidt reflector and intended for use as a large aperture photographic objective for telephotography.

In Fig. 1, 10 is a cylindrical optical element of glass or of some suitable transparent plastic material having a front curved surface 11 and a rear curved surface 12, both preferably spherical because of the manufacturing difficulties associated with the generation of aspherical surfaces, although an aspherical surface may be used at 11 in those instances where the resulting increased correction would warrant the additional cost of manufacture.

Cemented to the center of surface 11 is a lens 13 having a concave silvered surface 14 and a cemented surface 15 of the same curvature as surface 11. The cement employed is preferably a thermosetting plastic. A second cemented lens 16 is placed at the center of rear surface 12 of the main optical element 10 and is provided with spherical surfaces 17 and 18, the former having the same radius of curvature as surface 12. Surface 12 is silvered except at the center where lens 16 is cemented to provide an internally reflective surface.

A ray of light 20 entering the system is refracted slightly at the relatively weak surface 11 and is reflected by the silvered, internally reflecting surface 12. Ray 20 is then refracted at the cemented surface 15, reflected by the mirror surface 14 and again refracted by surface 15. In passing through the exit lens 16 to the plane of the photographic film P it is refracted at surfaces 17 and 18. Reflective surfaces 12 and 14 are of substantially equal radii and thereby contribute little to curvature of field and being reflecting surfaces they introduce no chromatic aberration. There remain sufficient degrees of freedom, surfaces 11, 14, 17 and 18, thicknesses $d_1$, $d_2$ and $d_3$ and the indices of refraction of elements 10, 13 and 16 to permit the system to be corrected astigmatically, comatically, spherically and for both axial and lateral chromatic aberration by suitable design in accordance with methods of calculation well known in the art.

Fig. 2 shows a solid Schmidt type mirror somewhat similar to that shown in Warmisham Patent 2,336,379, and particularly adapted for use as a photographic objective. The system shown in this modification comprises two cylindrical optical elements 21 and 22. Element 22 is similar in many respects to element 10 of Fig. 1 in that it is provided with reflecting surfaces 23 and 24 of substantially equal radii and a cemented lens element 25 having a curved surface 26. Element 21 is cemented to the front surface of element 22 and is provided with a weak refracting surface 27 placed at or before the center of curvature of surface 23. Surfaces 27 and 28 together afford corrections similar to that provided by the aspherical corrective plate of the normal Schmidt system. Surface 26 can have a curvature, the center of which is the axial focal point of the system, in which case it would contribute substantially nothing to the aberrations of the system or it can have some other curvature in which case it would be used to correct some of the residual aberrations. Being near the focal plane it could be used to alter the Petzval sum without contributing appreciably to the other aberrations of the system.

In Figs. 1 and 2 the aperture of the objective may be varied by the use of an iris diaphragm placed before the front refracting surface. A fairly long sunshade is needed to prevent stray light from striking the film plane.

It is to be understood that "glass" as used in this specification is intended to include any other known optical media including such synthetics as acrylic, polyvinyl and styrene resins.

What I claim as my invention and desire to secure by Letters Patent is:

1. An optical objective comprising in combination two spherical reflecting surfaces in axial alignment and constituting internal reflecting surfaces of a single glass element, one of said reflecting surfaces being convergent and annular in shape and the other being divergent and circular in shape and smaller in diameter than said annular reflector and located in front of the annular reflector a distance equal to about one fourth the focal length of the objective so as to receive light therefrom and reflect said light through the opening in the annular reflector, a front correcting lens cemented to the front surface of the reflecting element and a rear correcting lens cemented to the rear surface of the reflecting element, said correcting lenses acting to compensate for aberrations in the reflecting system.

2. An optical objective comprising in combination a refracting surface facing the incident light, a mirror concave to the incident light and having a radius of curvature approximately equal to the focal length of the objective and spaced rearwardly from the refracting surface in light receiving relation thereto, said refracting surface and said mirror being the front and rear surfaces respectively of a single refracting element, a mirror positioned at the center of the refracting surface and having a radius of curvature approximately equal to or less than that of the concave mirror and further having a diameter between one fifth and two thirds the diameter of the refracting surface, said mirror being positioned to receive light reflected from the aforesaid concave mirror and presenting a convex surface to the incident light said two mirrors being separated by a distance equal to one fourth to two thirds of the focal length of the objective, and a central opening in the concave mirror through which light reflected from the convex mirror is directed to the focal plane.

3. An optical objective comprising in combination a refracting surface facing the incident light, a mirror concave to the incident light and spaced rearwardly from the refracting surface in light receiving relation thereto and having a diameter approximately equal to that of the refracting surface, said refracting surface and said mirror being the front and rear surfaces respectively of a single body of refractive material, an internally reflecting mirror cemented to the center of the refracting surface and having a diameter of one fifth to two-thirds the diameter of the refracting surface, said mirror being positioned to receive light reflected from the concave mirror and presenting a convex surface to the incident light, a central opening in the concave mirror through which light reflected from the convex mirror is directed and an exit lens cemented to the refracting surface at the opening in the convex mirror to further reflect light leaving the objective.

4. An objective as claimed in claim 3 in which the radius of curvature of the concave mirror is approximately equal to or greater than the radius of curvature of the convex mirror.

5. An objective as claimed in claim 3 in which the separation between the convex and concave mirrors is between one-fifth and two-thirds of the focal length of the objective.

6. An optical objective as claimed in claim 3 in which the radius of curvature of the concave mirror is approximately equal to the focal length of the objective.

7. An optical objective comprising in combination a convex refracting surface facing the incident light, a mirror concave to the incident light and spaced rearwardly from the refracting surface in light receiving relation thereto and having a radius of curvature approximately equal to the focal length of the objective and having a diameter approximately equal to that of the refracting surface, said refracting surface and said mirror being the front and rear surfaces respectively of a single body of refractive material, an internally reflecting mirror cemented to the center of the refracting surface and having a diameter of from one-fifth to two-thirds the diameter of the refracting surface said mirror being positioned to receive light reflected from the concave mirror and presenting a convex surface to the incident light, the radius of curvature of said surface being approximately equal to or less than that of the concave mirror, a central opening in the mirror surface of the concave mirror through which light reflected from the convex mirror is directed and exit lens cemented to the refracting surface presented by the opening in the concave mirror surface to further refract light leaving the objective.

8. An optical objective as claimed in claim 7 in which the separation between the two mirrors is between one fifth and two thirds of the focal length of the objective.

9. An optical objective comprising in combination two spherical reflecting surfaces in axial alignment and constituting internal reflecting surfaces of a single glass element, one of said reflecting surfaces being convergent and annular in shape and the other being divergent and circular in shape and smaller in diameter than said annular reflector and located in front of the annular reflector a distance of from one fourth to one third the focal length of the objective so as to receive light therefrom and reflect said light through the opening in the annular reflector, the radii of curvature of said mirrors being substantially equal to each other and being approximately equal to the focal length of the objective and a correcting lens positioned at the opening in the annular mirror said correcting lens acting to compensate for aberrations in the reflecting system.

EDWARD K. KAPRELIAN.